United States Patent [19]

McCray et al.

[11] 4,135,418

[45] Jan. 23, 1979

[54] CLAMPING DEVICE

[75] Inventors: David M. McCray, Latrobe; Robert S. Gulibon, Mt. Pleasant, both of Pa.

[73] Assignee: Kennametal Inc., Latrobe, Pa.

[21] Appl. No.: 847,004

[22] Filed: Oct. 31, 1977

Related U.S. Application Data

[63] Continuation-in-part of Ser. No. 717,231, Aug. 24, 1976, abandoned.

[51] Int. Cl.² .................. B23B 29/00; B23B 5/22; B23B 31/10
[52] U.S. Cl. ........................... 82/36 A; 279/75; 408/239 R
[58] Field of Search ............. 82/36 R, 36 A; 408/231, 408/232, 233, 713, 238, 239, 240, 197; 279/2, 75, 76; 407/46, 101

[56] References Cited

U.S. PATENT DOCUMENTS

| | | | |
|---|---|---|---|
| 1,119,528 | 12/1914 | Nieman | 408/197 |
| 2,983,978 | 5/1961 | Wilgus | 279/75 |
| 3,115,798 | 12/1963 | Donaway | 279/2 |
| 3,498,653 | 3/1970 | McCreery | 82/36 A |
| 3,697,187 | 10/1972 | Faber et al. | 408/239 |

*Primary Examiner*—Harrison L. Hinson
*Attorney, Agent, or Firm*—Lawrence R. Burns

[57] ABSTRACT

A clamping device, especially for clamping tools in a turret or the like, in which each tool is provided with radially outwardly movable clamp elements and an actuating element carried by the tool movable axially for actuating the clamp elements. The turret in which the tool is mounted includes mechanism for driving the actuating element in actuating direction and for releasing the actuating element from actuating position to release the respective tool from the supporting turret.

45 Claims, 12 Drawing Figures

CLAMPING DEVICE

The present application is a Continuation-in-Part of copending application Ser. No. 717,231, filed Aug. 24, 1976, now abandoned and entitled "CLAMPING DEVICE."

The present invention relates to a clamping device and is particularly concerned with a clamping device for clamping tools in a turret or like support member.

In respect of machine tools and the like which are employed in production processes, it is important to be able to maintain the tool in proper workpiece operating condition at all times. What this involves is the maintaining of the cutting tools in the machine in sharp cutting condition, and this is best accomplished by replacing a cutting tool as soon as it has dulled a predetermined amount.

A great many cutting tool arrangements, at the present time, involve small inserts of extremely hard wear resistant material, such as cemented hard metal carbides, for example. These inserts are mounted, usually detachably, on tool holders which are, in turn, detachably mounted in the machine tool in which they are to be used.

Thus, it becomes possible quickly to renew a cutting tool either by replacing the insert in a respective tool holder, or by replacing the tool holder having the worn insert therein with another tool holder having a fresh insert therein. The last-mentioned procedure is often preferred because an insert can be exactly positioned in a tool holder externally of the machine tool and then, when the tool holder is placed in the machine tool, the insert will be precisely positioned and no other adjustments of the machine tool are required to continue producing workpieces having the proper dimensions.

In a prior U.S. Pat. No. 3,498,653, issued to James F. McCreery, a novel arrangement is illustrated for connecting tool holders to supporting members therefor, such as turrets and the like, in which a tool holder has radially movable clamping elements thereon actuated by an axially movable actuating member in the tool holder which, in turn, is moved toward and away from the clamping members by a screw also carried by the tool holder.

This arrangement has proved to be highly satisfactory in respect of locating and clamping tool holders in place, but requires the use of a wrench for turning the screw and is, therefore, somewhat slow in operation and somewhat laborious to use.

The present invention is concerned with an arrangement for clamping a tool holder in position in a turret or the like in which the tool holder has radially movable clamp elements therein and a reciprocable actuating element therein but, in respect of which, the mechanism for driving the actuating element into actuating position, and releasing it from actuating position, is carried by the turret or support member in which the tool holder is to be mounted.

An object of the present invention is the provision of an extremely rapid system for interchanging tools in a turret or like support member.

Another object is the provision of an arrangement for releasably connecting tools or tool holders in a support member, such as a turret, in which the tools or tool holders can be replaced quickly with a minimum of effort and even during operation of the machine of which the support member or turret forms a part.

Another object of the present invention is the provision of an arrangement of the nature referred to above which includes a coolant supply system for directing coolant in the cutting edge of the cutting tool carried by the respective tool holder.

BRIEF SUMMARY OF THE INVENTION

According to the present invention, a tool support member is provided which may be, for example, a turret rotatably mounted in a machine tool. Such arrangements are, of course, well known in the machine tool art. According to the present invention, each work station of the turret is provided with a bore for receiving one end of the shank portion of a tool holder, with the tool holder having an insert supporting portion at the other end of the shank which projects outwardly from the outer periphery of the turret when the tool holder is mounted therein.

The shank has an axial bore extending therein from the rearward end and radial bores which intersect the axial bore. Clamp elements, which may be in the form of balls, are disposed in the radial bores and an actuating element therefor, which may be in the form of another ball, is mounted in the axial bore of the rearward side of the clamp elements. The clamp elements are captive in the radial bores but are movable therein and, similarly, the actuating element is captive in the axial bore but is movable therein.

The support member, or turret, has mounted therein an actuator for engagement with the actuating element in the tool holder and which actuator is spring urged in a direction to drive the actuating element in actuating direction when the respective tool holder is in position in the respective bore in the turret.

According to the present invention, the actuator is movable in a direction to release the actuating element from actuating position by power means, or by manual means. At least the power means is constructed and arranged so as to be operable in respect of each work station of the turret or work member in a respective position thereof so that a single power means can be provided for releasing any tool holder from the turret when the tool holder is moved away from working position.

The present invention also includes a sensor which will interrupt operation of the machine or provide for an alarm signal in the event that any tool holder is improperly mounted in the support member or turret at the time the particular tool support is changed.

The present invention also provides a coolant system which directs coolant in the proper direction for a respective cutting insert mounted in the particular tool holder.

The exact nature of the present invention will become more apparent upon reference to the following detailed specification taken in connection with the accompanying drawings in which.

DETAILED DESCRIPTION OF THE INVENTION

Figure 1:
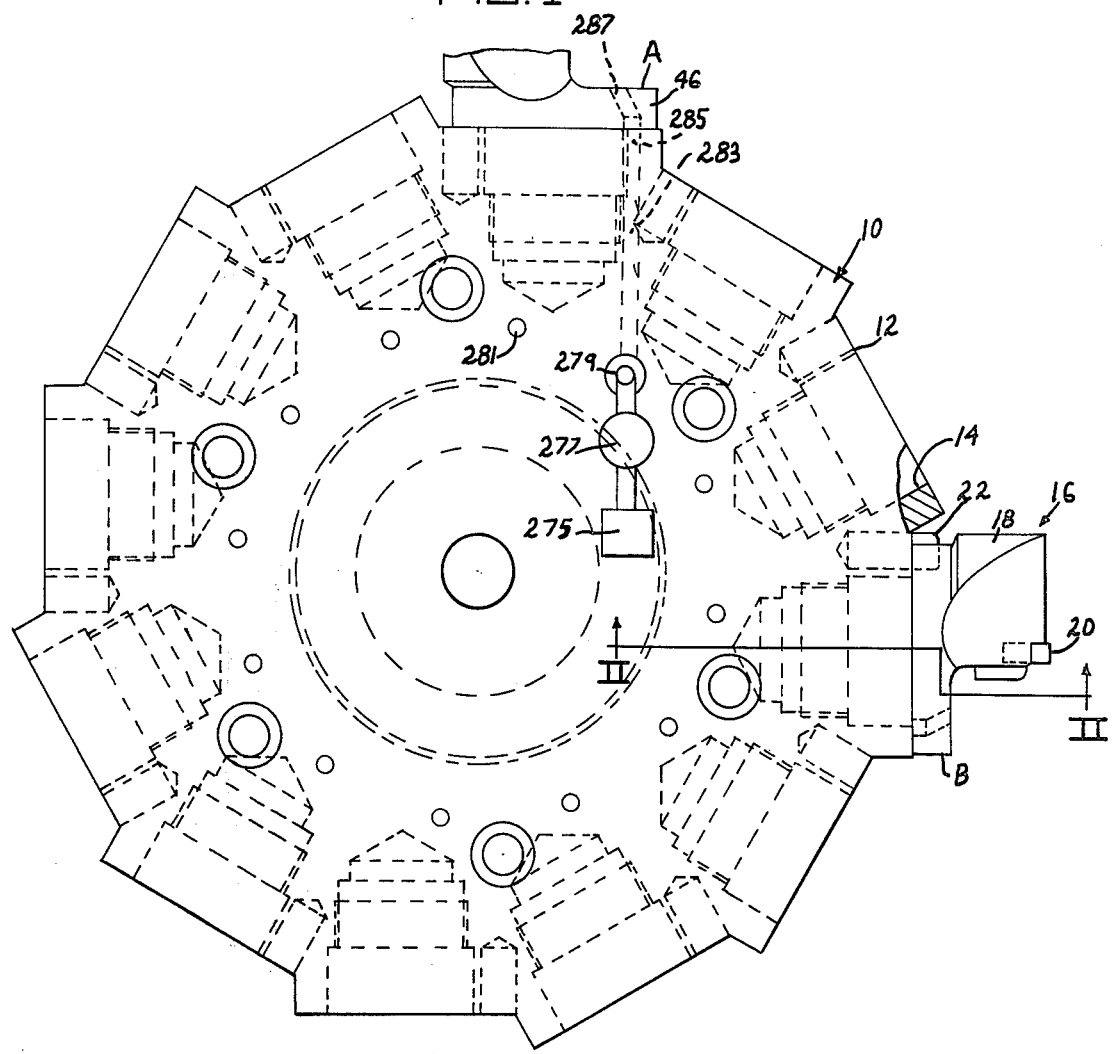
FIG. 1 is a plan view, somewhat schematic, showing one way in which a turret according to the present invention could be provided with tool holders according to the present invention and showing tool holders in two of the several positions of the turret.

Referring to the drawings somewhat more in detail, FIG. 1 shows in plan view a turret 10 having a plurality of work station positions 12 circumferentially distributed thereabout and each comprising a generally radial bore 14 formed in the turret with each bore adapted for receiving a tool assembly 16 which consists of a holder 18 and a cutting insert or cutting element 20 mounted thereon. In FIG. 1, only one tool assembly 16 is illustrated, but it will be understood that a tool assembly would be provided for each of the work stations 12.

Furthermore, the individual tool assemblies need not necessarily be oriented in the position illustrated, but could be positioned in different rotated positions on the respective axes of the tool units. In the arrangement shown in FIG. 1, each work station of the turret is provided with a key element 22 for engagement with a recess in the respective tool holder to hold the tool holder against rotation when mounted in the turret.

Figure 2:
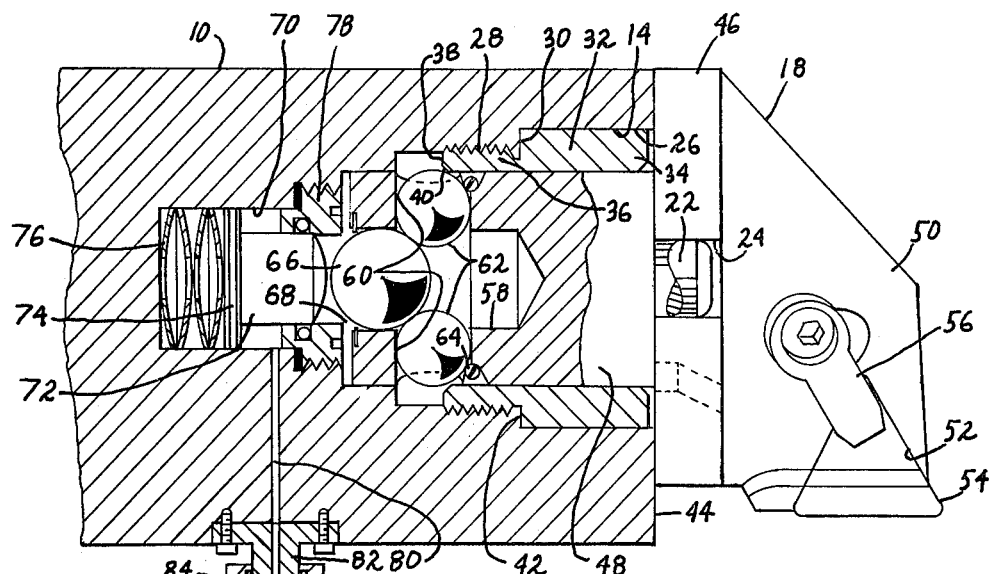
FIG. 2 is a sectional view indicated by line II—II on FIG. 1 and somewhat schematically illustrating the power system for controlling the clamping of tool holders in the turret.
Figure 3:
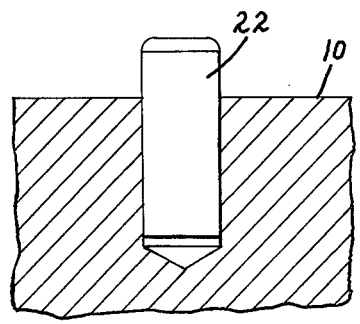
FIG. 3 is a fragmentary view showing the mounting of a key in the support member which engages a tool holder to prevent rotation thereof in the support member.

As will be seen in FIG. 3, each key element 22 may be in the form of a pin press fitted in an accurately located hole adjacent the work station with each holder 18 having a notch 24 (FIG. 2) for closely receiving the pin 22 pertaining to the respective work station. In FIG. 2, the notch 24 has been circumferentially displaced from the actual position thereof in order better to show how it is engaged by the key pin 22.

Reference to FIG. 2 will show that each bore 14 is provided with an outer larger diameter axial region 26 followed by a smaller diameter threaded region 28 with a shoulder 30 located therebetween and facing radially outwardly. The above described arrangement is provided for receiving a hardened sleeve 32 having an axially outer end portion 34 closely fitting in larger diameter 26 and with a threaded axial portion 36 threaded in threaded region 28.

The axially inner end 38 of sleeve 34 has a beveled region 40 about the inside which, due to the construction of the turret and the location of the shoulders 30 in the turret and 42 on the sleeve, provide for precise axial locating of beveled region 40 relative to the radially outwardly facing planar face 44 of the turret which surrounds the respective bore 14.

The holder 18, in addition to the radial portion 46 which abuts surface 44 of the turret, has a cylindrical shank 48 closely but slidably fitting inside sleeve 32. At the forward end, shank 48 is integral with head portion 50, which is provided with a pocket 52 for receiving a cutting insert 54 releasably clamped in place as by a clamp 56.

Shank 48 is axially bored from the rearward end by bore 58 and is provided with radial bores 60 within the axial range of beveled region 40. Clamp elements, which are advantageously in the form of balls 62, are radially movable in bores 60 into and out of engagement with shoulder 40. Advantageously, there are three of the bores 60 and three clamp elements in the form of balls 62 therein. The balls 62 are held captive in shank 48 as by a rubber-like "O" ring 64.

An actuating element 66, which may also be in the form of a ball, is disposed in shank 48 rearwardly of balls 62 and is held captive in the rearward end of shank 48 as by snap ring 68. When ball 66 is in its rearwardmost position, as determined by snap ring 68, balls 62 can move inwardly and the tool holder can be withdrawn from sleeve 34. However, if ball 66 is moved toward the right in FIG. 2, ball 62 will be driven radially outwardly into engagement with beveled region 40.

Turret 10, at the bottom of bore 14, is provided with a further bore 70 in which a plunger 72 having a piston head 74 is reciprocably mounted. Belville springs 76 bias plunger 72 toward ball 66 and are sufficiently strong to provide for actuation of ball 66 into clamping position. The right end of bore 70 is closed by a gland or ring element 78 which is sealed to the turret and also to plunger 72 and which defines a chamber with which a conduit 80 communicates. Conduit 80 leads through a ring 82 mounted on the bottom of the turret concentric with the axis of rotation thereof with ring 82 being sealingly engaged by a nonrotatable ring 84.

Ring 84 has a conduit 86 leading therefrom to the outlet of a manually operable valve 88 having a valve member 90 which, in the position shown, connects pump 92 with conduit 86 and therethrough with conduit 80 and in another position connects conduit 86 with tank or reservoir 94.

The arrangement is such that in each indexed position of the turret conduit 86 will register with the conduit 80 pertaining to a tool holder that is not in working position. At this time, manipulation of valve 90 will provide for movement of plunger 72 first leftwardly to release the pertaining tool holder from the turret and thereafter rightwardly to clamp another tool holder in the pertaining work station of the turret.

It will be appreciated that the releasing of a tool holder in the turret and the clamping of another therein can be accomplished extremely rapidly and without interrupting the cycle of the machine. In FIG. 1, for example, the tool holder shown at A, at the top of the view, is the one that is in working position, and the tool holder shown at B, and which is the one illustrated in FIG. 2, is in exchange position.

Figure 5:
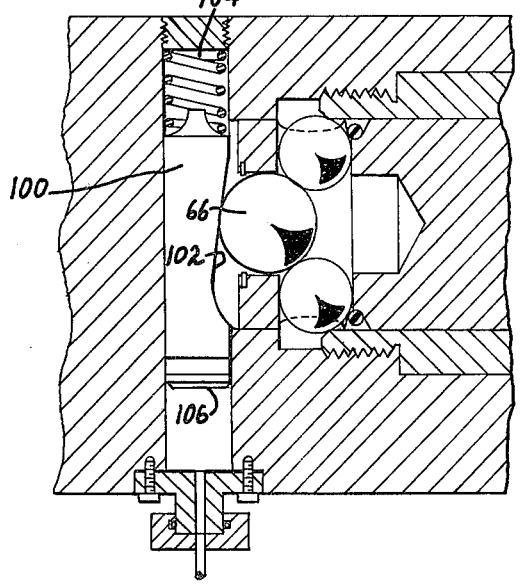
FIG. 5 is a sectional view similar to FIG. 2 but showing a modified construction.

Instead of radially movable plunger 72, a plunger 100, as disclosed in FIG. 5, could be employed for cooperation with actuating element 66. Plunger 100 has a cam surface 102 formed thereon for cooperation with actuating element 66 and is spring biased in one direction by spring 104 while being movable in the opposite direction by a supply of pressure fluid to the end 106 of the plunger. In operation, the modification of FIG. 5 is the same as that of FIG. 2.

Figure 6:
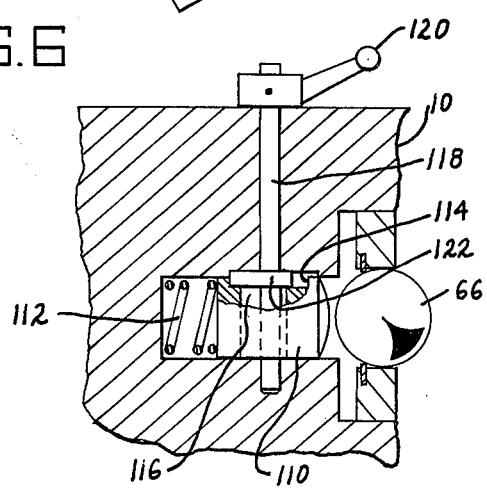
FIG. 6 is a fragmentary sectional view similar to FIG. 2 showing a still further modification.

FIG. 6 shows how an actuating plunger 110, which is biased by spring 112 toward actuating element 66, could be provided with means to withdraw the plunger, which means is manually operable. In FIG. 6, the plunger 110 has a transverse slot 114 in one side and, likewise, has an axial slot 116 extending therethrough.

A rod 118 extends through slot 116 and is rotatable in turret 10 and has a manually operable actuating lever 120 thereon and, furthermore, has an eccentric cam 122 located in slot 114. Rotation of lever 120 in any position of the turret will either release the respective tool holder from the pertaining work station or clamp a work holder in the respective work station.

Figure 4:
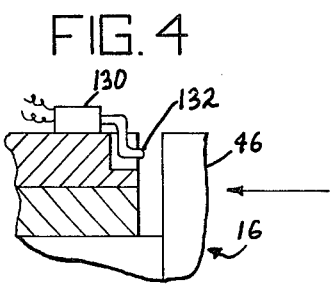
FIG. 4 is a fragmentary sectional view showing the provision of a sensor on the support member or turret for determining when a tool holder is properly mounted therein.

The machine may be provided with a sensor in the form of a limit switch 130, as shown in FIG. 4, which has an actuating finger 132 engageable by flange 46 of the respective tool assembly 16. If a tool assembly is clamped in the turret without being completely inserted therein, limit switch 130 will provide for the shutting down of the machine before the improperly mounted tool reaches working position, or the sounding of an alarm, or both.

Figure 7:
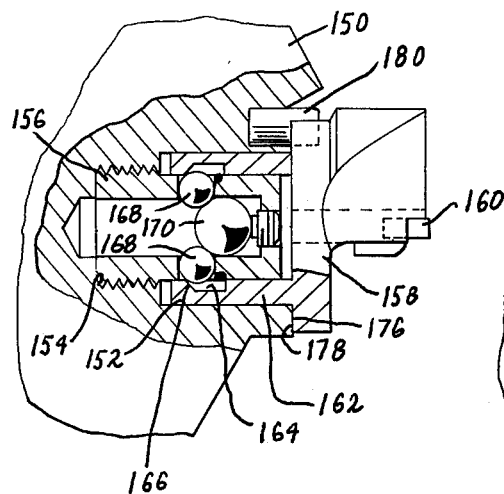
FIGS. 7 and 8 show inversions of the clamping system of the present invention.
Figure 8:
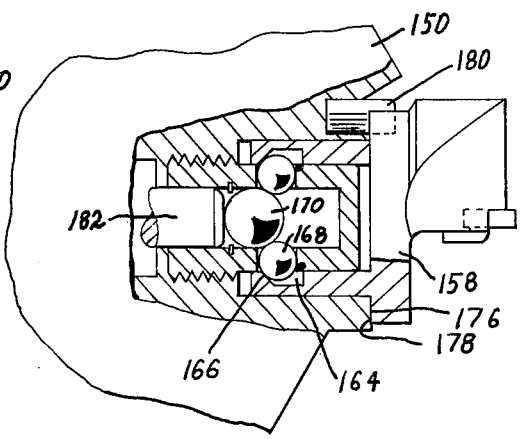

FIGS. 7 and 8 show inversions of the present invention in which the clamp elements and the actuating ball therefor are carried by the turret or support member. In FIG. 7, the turret or support member at 150 has a bore 152 formed therein which, at the bottom, is intersected by a threaded hole 154 in which a tubular element 156 is threadedly mounted. Tubular element 156 extends axially along bore 152 and defines an annular recess with the said bore.

In FIG. 7, the cutting insert supporting member is indicated at 158 and at the axially outer end has a pocket for receiving insert 160 while at the other end is formed with an annular shank 162 receivable in the annular recess formed by bore 152 and member 156. Shank 162 is provided internally with an annular groove 164 which forms a shoulder 166 engageable by clamp elements 168 which are mounted in radial holes formed in tubular member 156.

Clamp elements 168 are movable radially by an actuating ball 170 in tubular element 156 and adapted for abutment by a screw 172 that is actuatable by a suitable wrench introduced into bore 174 of the insert supporting member 158.

The support member 150 and insert support member 158 have respective elements of abutment means 176, 178 formed thereon so that when the insert supporting member, or tool holder, is inserted into the support member 150, which may be a turret, and screw 172 is actuated, the abutment surfaces 176, 178 will be firmly held together thereby to locate the tool holder axially in the support member and to lock it therein.

Rotation of the tool holder can be prevented by a key in the form of a pin 180 mounted in support member 150 and engaging a notch in the tool holder.

FIG. 8 is the same as FIG. 7 and employs the same reference numerals except that, in FIG. 8, actuating ball 170 is disposed on the rearward side of clamp elements 168 and is adapted for actuation to and from clamping position by a plunger 182 extending through the rearward or inner end of tubular member 156 and adapted for actuation either hydraulically or manually or by a cam arrangement according to any of the foregoing modifications.

Figure 9:
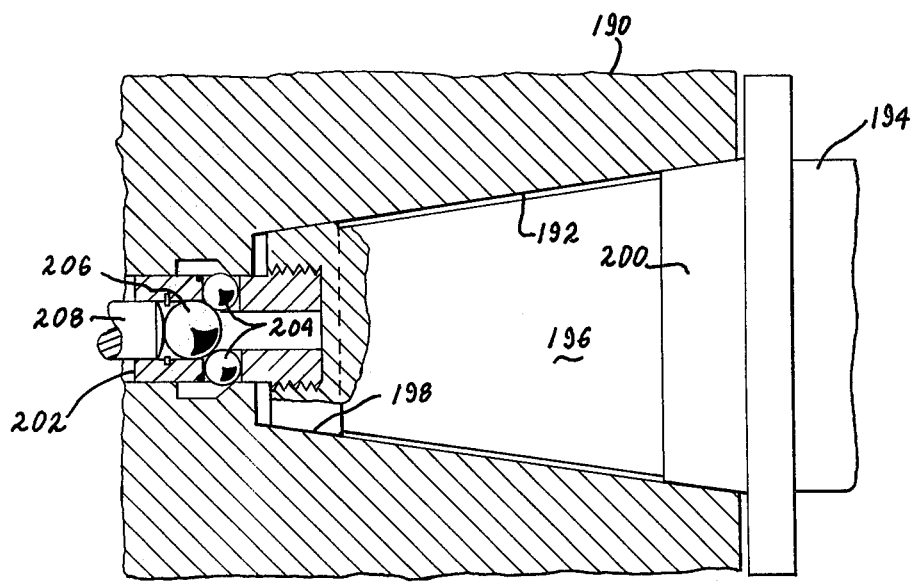
FIG. 9 shows the application of the invention on a tool holder having a tapered shank rather than a cylindrical shank.

In respect of FIG. 8, it will be understood that plunger 182 is preferably biased toward the right as it is viewed in FIG. 9 so that the tool holder is normally locked in support member 150.

In FIG. 9, a support member 190 is provided having a tapered recess 192 therein and a tool holder 194 has a tapered shank 196 seated in the tapered bore. As will be seen, the tool holder does not have any abutment surfaces perpendicular to the axis of the holder but is located in the support member 90 solely by engagement of the tapered surface portions 198 and 200 of the shank with the surface of the tapered bore.

In the FIG. 9 modification, a tubular member 202, similar in construction to tubular member 156 of FIGS. 7 and 8, is threaded into the end of tapered shank 196 and has mounted therein clamp elements 204 and an actuator ball 206 with the latter being positioned to be acted upon by a reciprocable plunger 208 carried by support member 190 and adapted for actuation in any of the manners previously described herein.

Figure 10:
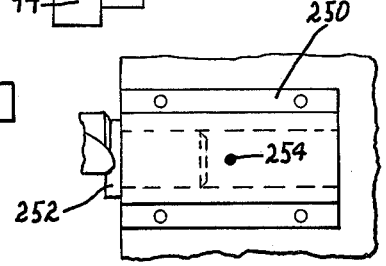
FIG. 10 is a schematic plan view showing a modification in which the support member is other than a multiple position turret.

FIG. 10 shows a modification in which a block 250 is provided which may be fixed to a machine slide and which is bored to receive a tool unit 252 to be retained in the block 250 by any of the mechanisms which have been described above. Block 250 could be employed with an automatic tool changer mechanism, in which case no indexing of the block would be necessary and tool units would be automatically removed therefrom and placed therein during operation of the machine.

It is also possible for block 250 to be indexable, for example, about a central axis extending through the point marked 254 in FIG. 10. In this case, a tool unit could be inserted into the central bore in the block from each end with each tool having a respective actuating mechanism pertaining thereto for locking the tool unit to the block. An arrangement of this nature is also adapted for use in connection with automatic tool changing units but has the advantage that one tool unit could be working while the other tool unit was being replaced.

When a tool holder presents an insert thereon to working position, it is desirable for the insert to be supplied with cooling fluid.

According to the present invention, a supply of cooling fluid is provided at 275 and is connected by a pump 277 with a stationary nozzle 279. As the turret indexes, nozzle 279 slides on the upper surface thereof and successively communicates with ports 281, each of which is connected by a respective passage means 283 with a port 285 which is engaged by the flange portion 46 of the respective tool holder.

The tool holder, in turn, has a passage 287 formed therein and communicating at one end with port 285 while the other end portion is directed so that coolant fluid emerging therefrom will be directed to the working region of an insert mounted in the respective tool holder.

As is known, the particular inserts in several tool holders will vary in configuration and the arrangement of the present invention provides for an adequate supply of cooling to each insert as it is brought into working position. The arrangement provides for economical use of the cooling fluid and relieves the operator from the necessity of making certain that each insert is properly supplied with cooling fluid.

Figure 11:
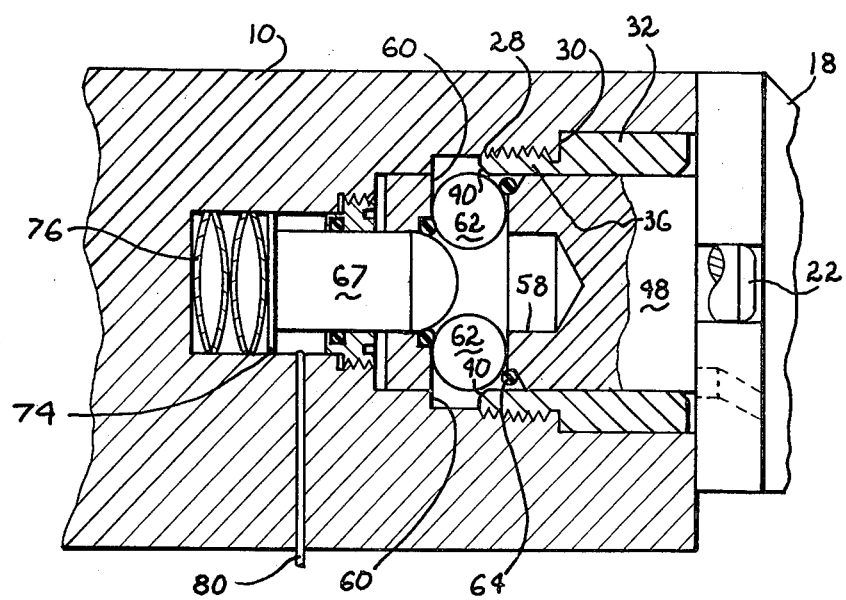
FIG. 11 is a modified view of the arrangement shown in FIG. 2.

In FIG. 11 is shown a construction similar to the structure shown in FIG. 2 and employs the same reference numerals except that, in FIG. 11, the clamp elements 62 are moved by an actuating means 67 which can be comprised in some cases as a one piece structure which would substitute for the actuating means 72 and the actuating element 66.

Figure 12:
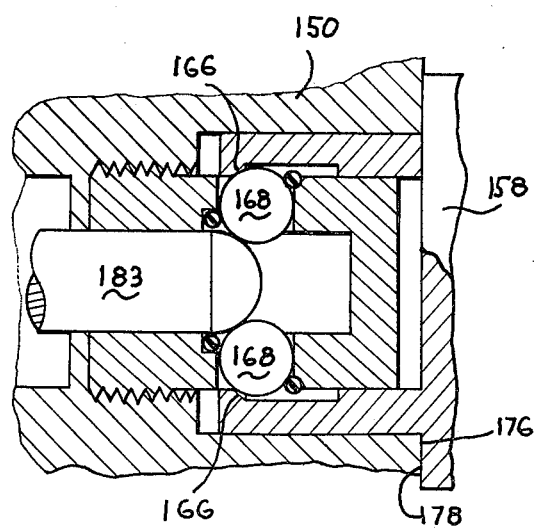
FIG. 12 is a modification of the arrangement shown in FIGS. 7 and 8.

With reference to FIG. 12, what is shown therein are arrangements similar to FIGS. 7 and 8 and employing many of the same reference numerals except that, in FIG. 12, again, an actuating means 183 comprises a one piece unit taking the place of plunger 182 and the actuating ball 170.

Modifications may be made within the scope of the appended claims.

What is claimed is:

1. In a turret for mounting on a machine; a tool holder having a shank with a free inner end and an insert supporting portion on the other end and a first abutment facing the free end, said turret having a bore to receive said shank inner end foremost and having a second abutment to engage said first abutment, an axial hole formed in said shank from the inner end thereof, radial holes extending inwardly in said shank and intersecting said axial hole and having axes disposed in a common plane perpendicular to the axis of said axial hole, outwardly movable clamp elements disposed in said radial holes, an actuator element in said axial hole on the side of said clamp elements facing the inner end of the shank, cooperating surfaces of abutment means on said clamp elements and in said bore, and actuating means located in said turret and operable for engaging said actuator element and for moving said actuator element toward said other end of said axial bore to urge said clamp elements radially outwardly in the respective radial holes so that said cooperating surfaces of abutment means engage and lock said tool holder against axial movement in said turret.

2. A turret according to claim 1 in which said outwardly movable clamp elements are in the form of balls.

3. A turret according to claim 2 in which said actuator element has a front end adjacent said balls and a rearward end spaced axially inwardly from said balls, said front end comprising a surface means for engagement with said balls, said surface means tapering outwardly toward the rearward end of said actuator element.

4. A turret according to claim 3 in which said actuating means comprises said actuator element.

5. A turret according to claim 3 in which said actuator element comprises a ball.

6. A turret according to claim 1 in which said actuating means comprises a rod-like element in said turret and movable into the axial hole in said shank from the inner end of the shank, said rod-like element having a first position in said turret in which said actuator ball engages said actuator element forwardly with sufficient force to cause said clamp elements to lock said tool holder in said turret, and a second position in said turret wherein said actuator ball is free to move inwardly to disengage from said clamp elements and release said tool holder for removal from or insertion into the said bore in said turret.

7. A turret according to claim 6 which further comprises spring means urging said rod-like element toward said first position thereon.

8. A turret according to claim 7 which further comprises selectively operable means for moving said rod-like element from said first position toward said second position.

9. A turret according to claim 8 in which said means for moving said rod-like element comprises a manual means.

10. A turret according to claim 8 in which said means for moving said rod-like element comprises hydraulic means.

11. A turret according to claim 6 in which said rod-like element has a longitudinal axis coaxial with the longitudinal axis of said bore in said turret.

12. A turret according to claim 6 in which said rod-like element has a longitudinal axis which is transverse to and intersects the said bore in said turret.

13. A turret according to claim 10 in which said turret comprises at least two bores with a said tool holder in each bore and a said hydraulic actuating means for unclamping each tool holder, the said hydraulic means for the respective tool holder being operable independently.

14. In a support member for mounting on a machine; a tool holder having a shank on one end and an insert supporting portion on an opposite end, a bore formed in said support member, an intermediate unit fixed in said bore, said intermediate unit having an axial perforation formed therein, recesses extending radially inwardly of said intermediate unit and intersecting said axial perforation, outwardly movable clamp elements disposed in said recesses, said shank having an aperture formed along its axis and adapted for telescopic engagement over one end of said intermediate unit, cooperating surfaces of abutment means on said clamp elements and in said aperture, an actuator element in said intermediate unit to engage and move said clamp elements, and means for moving said actuator element so that said cooperating surfaces of abutment are engaged to lock said tool holder on said intermediate unit.

15. A support member according to claim 14 in which said cooperating surfaces of abutment between said clamp elements and said aperture comprises balls having spherical surfaces for abutment in said aperture and said aperture has an internal groove formed therein with an abutment surface facing outwardly toward said insert supporting portion of said tool holder.

16. A support member according to claim 15 in which said actuator element has a front end adjacent said balls and a rearward end spaced axially inwardly from said balls, said front end comprising a surface means for engagement with said balls, said surface means tapering outwardly toward the rearward end of said actuator element.

17. A support member according to claim 16 in which said actuating means comprises said actuator element.

18. A support member according to claim 17 in which said actuator element comprises a ball.

19. A support member according to claim 18 in which said actuating means comprises a passageway formed in said support member and communicating with said axial perforation in said intermediate unit, a rod-like element disposed in said passageway and movable thereto to communicate with said axial perforation in said intermediate unit, said rod-like element having a first position in said passageway urging said actuator ball forwardly with sufficient force to engage said clamp elements and lock said tool holder to said intermediate unit, and a second position in said passageway wherein said actuator ball may move inwardly toward said support member to disengage and remove said tool holder from said intermediate unit.

20. A support member according to claim 19 which further comprises a compressed spring element disposed in said passageway and urging said rod-like element into said first position.

21. A support member according to claim 20 which further comprises means for moving said rod-like element from said first position to said second position and further compressing said spring.

22. A support member according to claim 21 which further comprises at least two tool holders mounted around said support member and a hydraulic means for moving said rod-like elements, said hydraulic means operable independently in respect of each tool holder.

23. An intermediate unit for locking a shank of a tool holder to a machine support member, said intermediate unit comprising; a tubular element having opposite ends and adapted for mounting in a bore in the support member on the axis of the bore and with one end engaging the support member at the bottom of the bore, the other end of said tubular element adapted for telescopically engaging a perforation formed in the shank of the tool holder, an axial perforation formed in said tubular element, radial holes in said tubular element intersecting said axial perforations, outwardly movable clamp elements disposed in said radial holes and an actuating element in said axial perforation for moving said clamp elements radially, abutment surfaces on the outer ends of said clamp elements for cooperating with an abutment surface located in the axial perforation of said tubular element, and actuating means for moving said actuator element axially in said perforation so that the abutment surfaces on the clamp elements can engage the abutment surface in the perforation of a tool holder in the support member bore and surrounding said tubular element.

24. A unit according to claim 23 in which said actuating means comprises a screw in the said other end of said tubular member having an outer end engageable through a tool holder mounted in the bore in the support member and an inner end engageable with said actuating element.

25. A unit according to claim 23 in which said actuating means comprises a plunger in the support member movable axially into the perforation in the tubular element from said one end of the tubular element and engageable with said actuating element.

26. A turret according to claim 1 in which said turret has a plurality of the said tool holder receiving bores therein and indexable to present the tool holders selectively to a predetermined working position, a respective hydraulic actuating means for each bore engageable for releasing the tool holder from the bore, a supply of fluid under pressure, means for connecting each hydraulic actuating means to the said source in an indexed position of the turret in which the respective tool holder is in a position other than said predetermined position, and valve means for controlling the supply of fluid from said source to the respective hydraulic actuator means connected thereto.

27. A turret according to claim 1 in which said turret has a plurality of the said tool holder receiving bores therein and indexable to present the tool holders selectively to a predetermined working position, a source of coolant fluid, passage means in the turret selectively connecting the source with the tool holder which is in working position, and a channel formed in each tool holder having one end communicating with said passage means and the other end positioned to supply coolant to the working region of a cutting insert mounted thereon.

28. A turret according to claim 6 which includes means operable in the event of failure of said abutments to prevent operation of the machine.

29. In combination; a support member especially for mounting on a machine, a tool holder having a shank with a free inner end and an insert supporting portion on the other end and a first abutment facing the free end, said support member having a bore to receive said shank inner end foremost and havng a second abutment to engage said first abutment, an axial hole formed in said shank from the inner end thereof, radial holes extending inwardly in said shank and intersecting said axial hole and having axes disposed in a common plane substantially perpendicular to the axis of said axial hole, outwardly movable clamp elements disposed in said radial holes, cooperating surfaces of abutment means on said clamp elements and in said bore, and actuating means comprising a rod-like element mounted in said support member and having a portion movable into the axial hole in said shank from the inner end of the shank, said rod-like element havng a first position to urge said clamp elements radially outwardly in the respective radial holes so that said cooperating surfaces of abutment means engage and lock said tool holder against axial movement in said support member, said rod-like element having a second position in said support member disengaged from said clamp elements so that said tool holder is released for removal from or insertion into said bore in said support member.

30. The combination according to claim 29 wherein said actuating means is further comprised of said rod-like element and an actuator element in said axial hole on the side of said clamp elements facing the inner end of the shank, said rod-like element moving said actuator element to actuate said clamping element.

31. In a support member for mounting on a machine; a tool holder having a shank with a free inner end and an insert supporting portion on the other end and a first abutment facing the free end, said support member having a bore to receive said shank inner end foremost and having a second abutment to engage said first abutment, an axial hole formed in said shank from the inner end thereof, radial holes extending inwardly in said shank and intersecting said axial hole and having axes disposed in a common plane perpendicular to the axis of said axial hole, outwardly movable clamp elements disposed in said radial holes, an actuator element in said axial hole on the side of said clamp elements facing the inner end of the shank, cooperating surfaces of abutment means on said clamp elements and in said bore, and actuating means comprising a rod-like element located in said support member and having one end portion movable into the axial hole in said shank from the inner end of said shank and said rod-like element having a first position in said support member operable for engaging said actuator element and for moving said actuator element toward said other end of said axial bore to urge said clamp elements radially outwardly in the respective radial holes so that said cooperating surfaces of abutment means engage and lock said tool holder against axial movement in said support member, said rod-like member having a second position in said support member wherein said actuator element is free to move so as to disengage from said clamp elements and release said tool holder for removal from or insertion into said bore in said support member.

32. A support member according to claim 31 in which said outwardly movable clamp elements are in the form of balls.

33. A support member according to claim 32 in which said actuator element has a front end adjacent said balls and a rearward end spaced axially inwardly from said balls, said front end comprising a surface means for engagement with said balls, said surface means tapering outwardly toward the rearward end of said actuator element.

34. A support member according to claim 33 in which said actuating means comprises said actuator element.

35. A support member according to claim 33 in which said actuator element comprises a ball.

36. A support member according to claim 31 which further comprises spring means urging said rod-like element toward said first position thereon.

37. A support member according to claim 36 which further comprises selectively operable means for moving said rod-like element from said first position toward said second position.

38. A support member according to claim 37 in which said means for moving said rod-like element comprises a manual means.

39. A support member according to claim 37 in which said means for moving said rod-like element comprises hydraulic means.

40. A support member according to claim 31 in which said rod-like element has a longitudinal axis coaxial with the longitudinal axis of said bore in said support member.

41. A support member according to claim 31 in which said rod-like element has a longitudinal axis which is transverse to and intersects the said bore in said support member.

42. A support member according to claim 39 in which said support member comprises at least two bores with a said tool holder in each bore and a said hydraulic actuating means for unclamping each tool holder, the said hydraulic means for the respective tool holder being operable independently.

43. A support member according to claim 31 in which said support member is a turret and has a plurality of the said tool holder receiving bores therein and indexable to present the tool holders selectively to a predetermined working position, a respective hydraulic actuating means for each bore engageable for releasing the tool holder from the bore, a supply of fluid under pressure, means for connecting each hydraulic actuating means to the said source in an indexed position of the turret in which the respective tool holder is in a position other than said predetermined position, and valve means for controlling the supply of fluid from said source to the respective hydraulic actuator means connected thereto.

44. A support member according to claim 31 in which said support member is a turret and has a plurality of the said tool holders receiving bores therein and indexable to present the tool holders selectively to a predetermined working position, a source of coolant fluid, passage means in the turret selectively connecting the source with the tool holder which is in working position, and a channel formed in each tool holder having one end communicating with said passage means and the other end positioned to supply coolant to the working region of a cutting insert mounted thereon.

45. A support member according to claim 31 which includes means operable in the event of failure of said abutments to prevent operation of the machine.

* * * * *